United States Patent
Kozitsky et al.

(10) Patent No.: US 9,824,289 B2
(45) Date of Patent: Nov. 21, 2017

(54) EXPLOITING COLOR FOR LICENSE PLATE RECOGNITION

(71) Applicant: Xerox Corporation, Norwalk, CT (US)

(72) Inventors: Vladimir Kozitsky, Rochester, NY (US); Martin S. Maltz, Rochester, NY (US)

(73) Assignee: Conduent Business Services, LLC, Dallas, TX (US)

( * ) Notice: Subject to any disclaimer, the term of this patent is extended or adjusted under 35 U.S.C. 154(b) by 119 days.

(21) Appl. No.: 14/960,627

(22) Filed: Dec. 7, 2015

(65) Prior Publication Data

US 2017/0161581 A1 Jun. 8, 2017

(51) Int. Cl.
*G06K 9/00* (2006.01)
*G06K 9/32* (2006.01)
*G06T 7/00* (2017.01)
*G06T 7/40* (2017.01)

(52) U.S. Cl.
CPC .......... *G06K 9/3258* (2013.01); *G06T 7/0081* (2013.01); *G06T 7/408* (2013.01); *G06K 2209/01* (2013.01); *G06K 2209/15* (2013.01); *G06T 2207/10024* (2013.01); *G06T 2207/30252* (2013.01)

(58) Field of Classification Search
CPC .............. G06K 9/3258; G06K 2209/01; G06K 2209/15; G06T 2207/30252; G06T 2207/10024
See application file for complete search history.

(56) References Cited

U.S. PATENT DOCUMENTS

| 8,704,889 | B2 | 4/2014 | Hofman |
| 8,922,656 | B2 | 12/2014 | Quinn et al. |
| 8,953,846 | B2 | 2/2015 | Wu et al. |
| 9,064,406 | B1 | 6/2015 | Stevens et al. |
| 9,064,415 | B2 | 6/2015 | Nerayoff et al. |
| 9,147,116 | B2 | 9/2015 | Kadoch et al. |
| 9,171,382 | B2 | 10/2015 | Nerayoff et al. |
| 9,177,211 | B2 | 11/2015 | Lehning |
| 9,195,901 | B2 | 11/2015 | Kaiser-Pendergrast |
| 9,253,460 | B1 * | 2/2016 | Wang ............... H04N 9/735 |
| 2005/0180645 | A1 * | 8/2005 | Hasegawa ........ G06K 9/00456 382/239 |
| 2005/0286097 | A1 * | 12/2005 | Hung .................. H04N 1/608 358/509 |
| 2008/0101690 | A1 * | 5/2008 | Hsu .................... H04N 1/6027 382/162 |
| 2010/0150457 | A1 | 6/2010 | Angell et al. |

(Continued)

*Primary Examiner* — John Strege
(74) *Attorney, Agent, or Firm* — Kermit D. Lopez; Luis M. Ortiz; Ortiz & Lopez, PLLC (57) ABSTRACT

Methods and systems for exploiting color for object recognition. A color gradient for each pixel in a gradient image of an object can be calculated. The gradient image can be binarized to produce an image having white walls around characters and other structures. A connected component analysis operation can be performed with respect to black regions in the image to determine bounding boxes for characters and other pictorial elements in the image and thereafter identify character candidates from the image utilizing character metrics. Non-character colors can then be eliminated from the image utilizing an outlier rejection.

20 Claims, 6 Drawing Sheets

(56) References Cited

U.S. PATENT DOCUMENTS

| | | | |
|---|---|---|---|
| 2011/0075921 A1* | 3/2011 | Sun | G06T 11/001 382/164 |
| 2011/0096190 A1* | 4/2011 | Silverstein | H04N 9/735 348/223.1 |
| 2011/0135156 A1* | 6/2011 | Chen | G06K 9/325 382/105 |
| 2012/0086828 A1* | 4/2012 | Li | H04N 9/73 348/223.1 |
| 2012/0134584 A1* | 5/2012 | Kondo | H04N 1/608 382/167 |
| 2014/0028697 A1* | 1/2014 | Kurtz | G01J 3/465 345/589 |
| 2014/0056483 A1 | 2/2014 | Angell et al. | |
| 2014/0301606 A1 | 10/2014 | Paul et al. | |
| 2014/0348392 A1 | 11/2014 | Burry et al. | |
| 2014/0355836 A1 | 12/2014 | Kozitsky et al. | |
| 2014/0363052 A1 | 12/2014 | Kozitsky et al. | |
| 2016/0210523 A1* | 7/2016 | Abdollahian | G06K 9/00442 |
| 2016/0232410 A1* | 8/2016 | Kelly | G06K 9/00711 |
| 2017/0150114 A9* | 5/2017 | Wang | H04N 9/735 |

* cited by examiner

EXPLOITING COLOR FOR LICENSE PLATE RECOGNITION

TECHNICAL FIELD

Embodiments are generally related to the field of image processing. Embodiments also relate to object recognition. Embodiments further relate to license plate recognition and the exploitation of color in the recognition of license plates and other objects.

BACKGROUND

LPR (License Plate Recognition) or ALPR (Automatic License Plate Recognition) is an object recognition technology that typically includes image-processing operations with functions as the core module of "intelligent" transportation infrastructure applications. License plate recognition techniques, such as ALPR, can be employed to identify a vehicle by automatically reading a license plate utilizing image processing and character recognition technologies. A license plate recognition operation can be performed by locating a license plate in an image, segmenting the characters in the captured image of the plate, and then performing an OCR (Optical Character Recognition) operation with respect to the identified characters.

The ALPR problem is often decomposed into a sequence of image processing operations: locating the sub-image containing the license plate (i.e., plate localization), extracting images of individual characters (i.e., segmentation), and performing optical character recognition (OCR) on these character images.

A problem in license plate recognition technologies that must be considered is the presence of color. Consider a license plate with a colored pictorial background. Eventually, it is desirable to present a binary image to an OCR module. The simple technique of rendering a gray image from luminance channel of the colored image, then thresholding it, often confuses pictorial elements of the image with the characters.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved methods and systems for object recognition.

It is another aspect of the disclosed embodiments to provide methods and systems for exploiting color in license plate recognition.

It is yet another aspect of the disclosed embodiments to provide for methods and systems for determining the distribution of character colors in an image and declaring as background all colors that are sufficiently far from the average character color to assist in object recognition such as license plate recognition.

The aforementioned aspects and other objectives and advantages can now be achieved as described herein. In an example embodiment, a method for exploiting color for object recognition can be implemented. Such a method can include steps or operations for identifying one or more regions of an image having character-like features, obtaining an average color of the region (or regions) after discarding outliers associated with the region(s), and modifying all portions of the image with colors sufficiently far from the average color to white. Discarding of the outliers associated with the region(s) can involve eliminating non-character colors in the region(s) utilizing an outlier rejection.

The average color can constitute an average character color and in some example embodiments, the aforementioned character-like features can be, for example, a pixel count, a pixel size, etc.

In an example embodiment, the aforementioned image may constitute a three-channel text image. A step or operation can he implemented for converting the three-channel text image to a single channel image having a contrast between text and background maximized in the single channel image.

In another example embodiment, methods and systems can be implemented for exploiting color for object recognition (e.g., license plate recognition) are disclosed. The color gradient for each pixel in a gradient image of an object can be calculated. The gradient image is then binarized to produce an image having white walls around characters and other structures. A connected component analysis is performed with respect to black regions in the image to determine bounding boxes for characters and other pictorial elements in the image and thereafter identify character candidates from the image utilizing character metrics. Non-character colors are then eliminated from the image utilizing an outlier rejection.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In an example embodiment, the distribution of character colors can be determined and an operation performed to declare as background all colors that are sufficiently far from the average color. The range of gray levels of pixels associated with characters is stretched to fill the 0-255 range and the background is set to white or near white. This gray image can then be fed to the rest of an ALPR image-processing pipeline (e.g., see FIG. 7). The higher contrast and removal of confusing structures greatly improves its performance.

To find the character colors, we must first find at least one character. To do this we calculate a color gradient for each pixel and binarize the gradient image. The result is white walls around the characters and other structures. We then do a connected component analysis on the black regions to find bounding boxes for characters and other pictorial elements. Using various character metrics (pixel count, height, and width), character candidates is identified. An outlier rejection can then be utilized to eliminate the non-character colors. Actually carrying out these steps involves overcoming several problems. Solutions to these problems are discussed in further detail herein.

At each pixel, a linear relationship between color (L*, a*, b*) and position (X, Y) is found by minimizing the squared error. The magnitude of the color gradient is the square root of the sum of the squares of all the partial derivatives. The gradient image must then be normalized to some reasonable range (0-255) before binarization. However, very strong specular reflections off metal components of the car can produce very large gradients. We therefore histogram the gradients and eliminate a very small fraction of the largest ones. The remaining gradients are then normalized to the 0-255 range.

Figure 1:
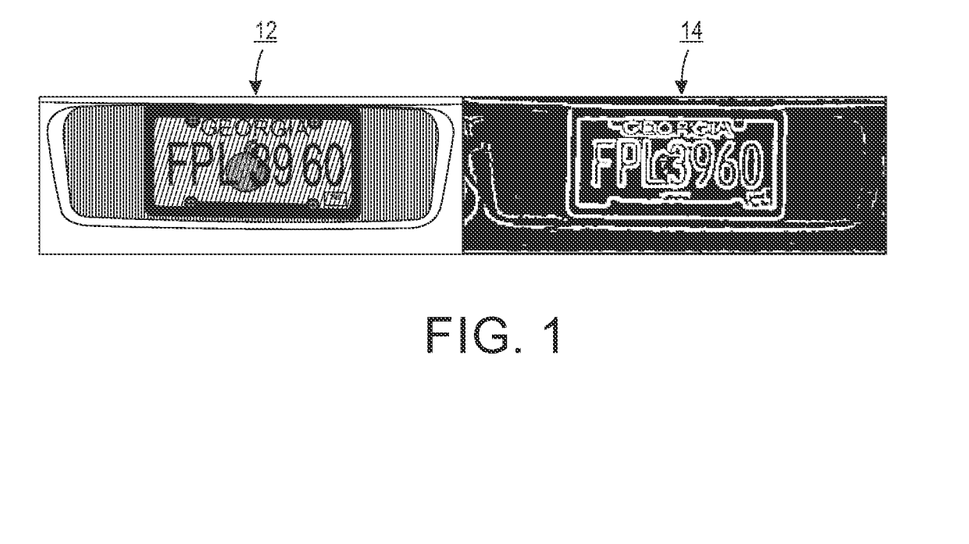
FIG. 1 illustrates a pictorial diagram of an original image and an image with binarized gradients, in accordance with an example embodiment.

Finally, an adaptive threshold can be utilized for binarization. Pixels with values that are a fixed amount above the average surround can be set to 255 and the rest can be set to 0. FIG. 1 illustrates a pictorial diagram of an original image 12 and an image 14 with binarized gradients, in accordance with an example embodiment.

The next step is to perform a flood fill of the black areas to determine connected components and their bounding boxes. Connected components with character-like statistics can then be identified. Many of the walls around characters, however, possess breaks. The corresponding connected component may "leak" out of the character and can cover a large area of the plate, and may therefore not be recognized as a character. An example of such a leak can be seen in the lower part of the "L" between the "L" and the "3".

Figure 2:
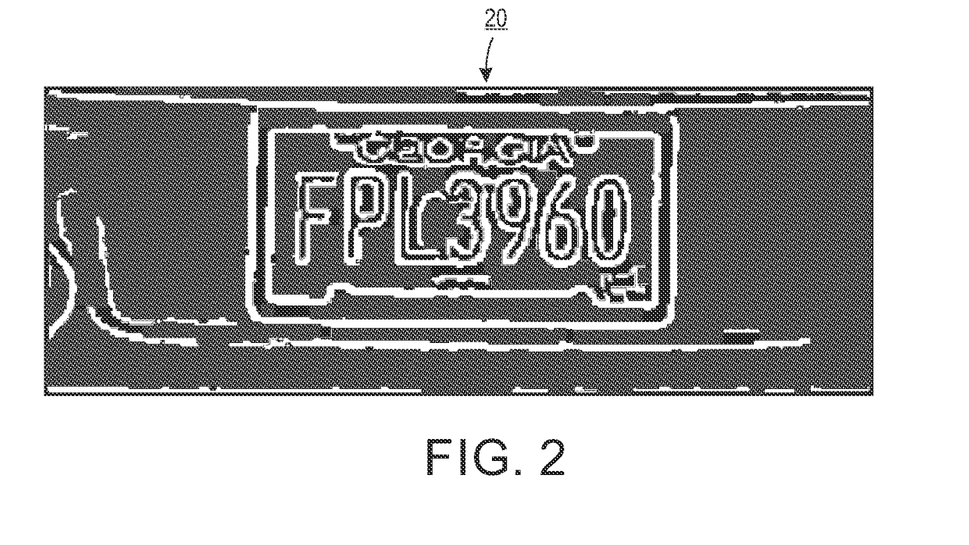
FIG. 2 illustrates a pictorial diagram of a plugged image, in accordance with an example embodiment.

Leaks can be plugged utilizing morphology. A copy of the binarized image can be made, which is referred to as the "morph" image. The morph image can be dilated and eroded by enough to leave the narrow channels in the characters filled with white pixels. The pixels in the binarized image can then be set to a gray value wherever the morph image is black. The gray pixels plug the leaks. The result of such an operation is shown in FIG. 2, which can be referred to as the "plugged" image. FIG. 2 thus illustrates a pictorial diagram of a plugged image 20, in accordance with an example embodiment.

Note that the many small white specs in the previous binarized image are not visible in the plugged image. This is because they were removed from the binarized image before making the "morph" image. This was done because the space between a collection of small white pixels might fill in during the dilation step, and not be emptied during the erosion. The result would be a black channel in the region between the white specs. An example of this is shown in the lower right hand part of the license plate in the plugged image, where the white fragments were too big to be removed by the spec removal code. If such a situation occurred in the vicinity of a leak, it would provide a channel for the connected component to leak out of the character. To remove the specs, we do a connected component analysis of all the white pixels in the binarized image. Those that contain too few pixels are eliminated.

Figure 3:
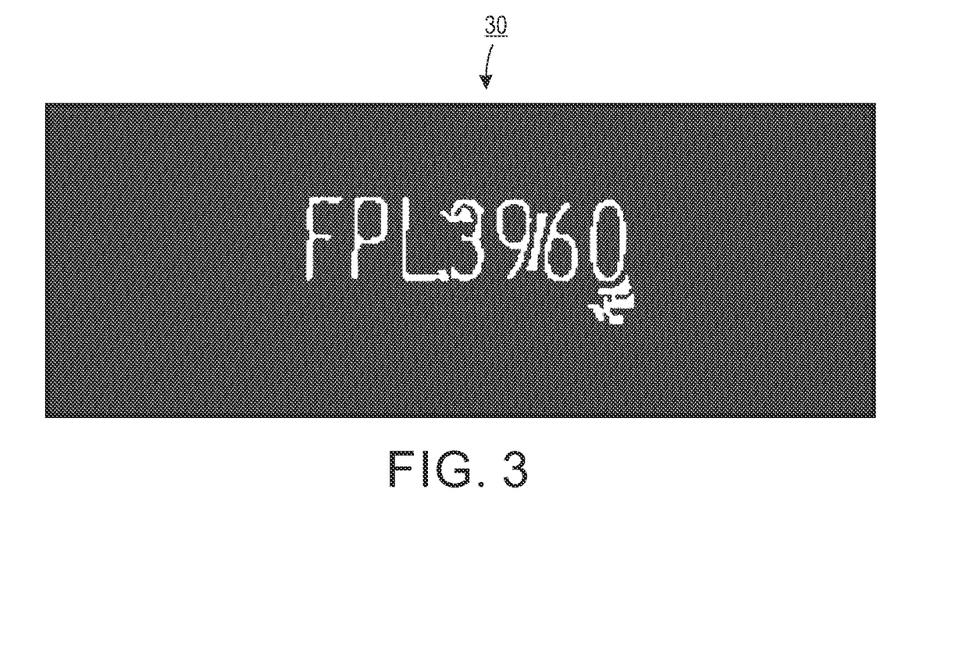
FIG. 3 illustrates a pictorial diagram of a masked image, in accordance with an example embodiment.

Next, a connected component analysis of the black regions of the plugged image can be performed. The seed for each connected component is every black pixel that is not already part of a connected component. The number of pixels in each connected component, and the height and width of the bounding box, can then be compared with the values expected for a character and an operation performed to reject any that do not satisfy these conditions. The results of this connected component analysis are recorded in the mask image 30 shown in FIG. 3. That is, FIG. 3 illustrates a pictorial diagram of a masked image 30, in accordance with an example embodiment.

All pixels in the mask can be initially set to zero. As each connected component in the plugged image is found, the corresponding pixels in the mask are set to an index value. The code initially paints each connected component in the mask with the smallest unused index with a value greater than 1. If the connected component does not satisfy the character requirements, it is repainted with a value 1, leaving its previous value available for the next connected component. In the original mask image, the range of indices goes from 0-10 and would not be visible. Therefore, in the image 30 shown in FIG. 3, pixels with indices 0 or 1 are black and pixels with larger indices are set to white.

Figure 4:
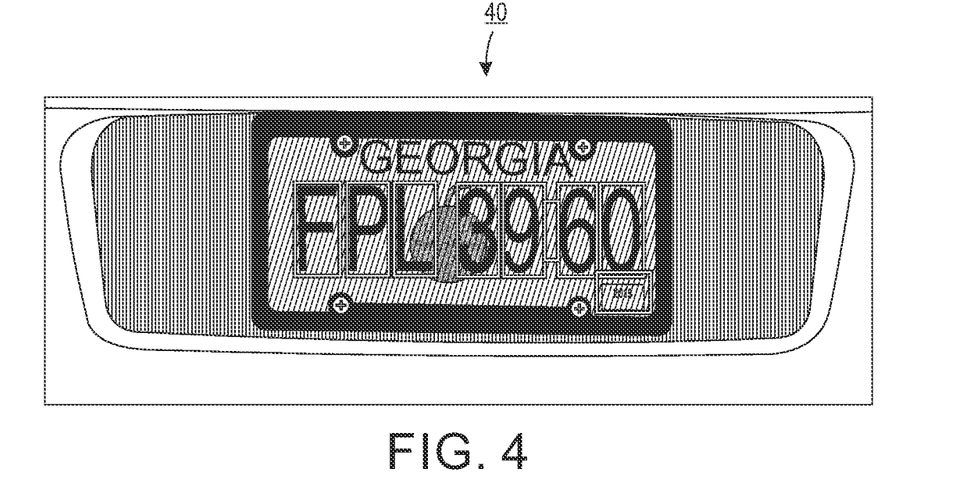
FIG. 4 illustrates a pictorial diagram of an image with bounding boxes, in accordance with an example embodiment.

FIG. 4 illustrates a pictorial diagram of an image 40 with bounding boxes, in accordance with an example embodiment. That is, the corresponding bounding boxes are shown in FIG. 4. Note that the region between the "9" and the "6" and the region below the "0" have been falsely identified as characters. In the mask image, also note that some leakage has occurred from the bottom of the "L" and the top of the "3".

To limit the ability of a region of large fragments to masquerade as a character, as occurs below the "0", an additional test is applied before a black connected component in the plugged image is declared a character. The pixels in each white (not gray) wall in the plugged, image that contact the candidate black connected component are found by doing a white connected component analysis. The number of such wall fragments is counted. If this exceeds a threshold, the black connected component is not a character. This test fails for the region below the "0" because there are only 3 fragments.

It is clear from the above that not all the colored pixels in the character-like connected components are part of a character. To handle this problem we do outlier rejection in an L*a*b* color space. In this approximately perceptually uniform color space, L* is the lightness, a* is the magenta axis (neutral is 0 and negative is green), and b* is the yellow axis (neutral is 0 and negative is blue). We calculate the covariance matrix for a list containing the colors of all the pixels assumed to be in the characters. We then calculate the "distance" of each pixel from the average character color using the equation:

$$D = V^t M V$$

where V=P−A, $V^t$ is its transpose, M is the inverse of the covariance matrix, P is the pixel color, and A is the average character color. We eliminate all pixels where D is greater than a specified value, recalculate the covariance matrix and the average character color, and iterate until no more pixels are removed.

Figure 5:
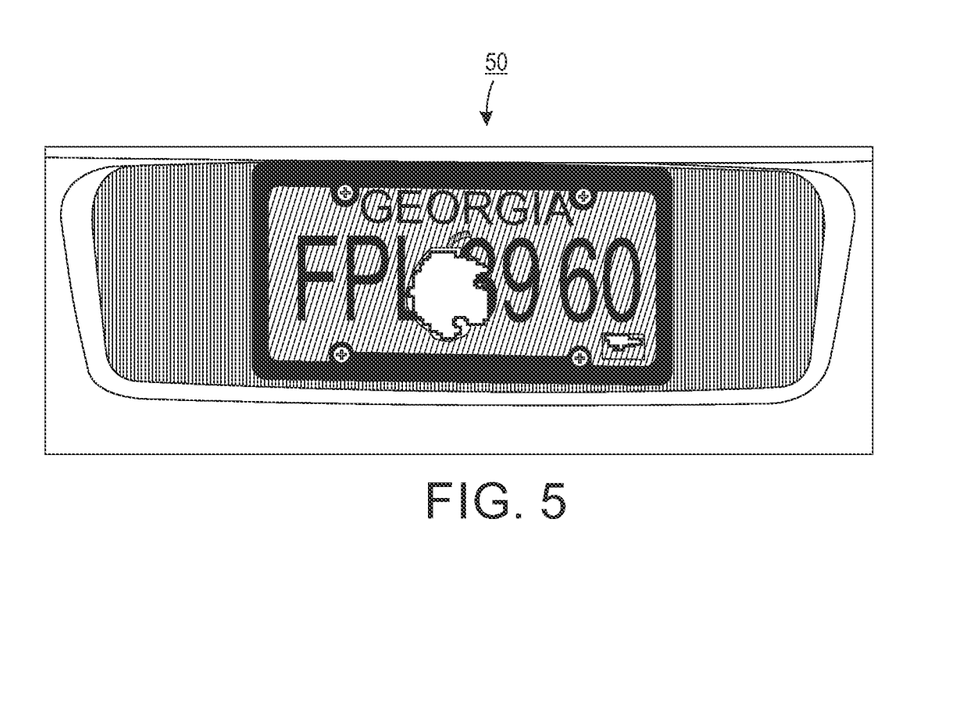
FIG. 5 illustrates a pictorial diagram of an image in which the dynamic range of a gray image is expanded so that the highest character level maps to 255, with the darkest character level mapping to 0, in accordance with an example embodiment.

The existing license plate recognition pipeline accepts a gray image, so in this step we first generate a gray image the usual way and then remove the background. To do this, we go through all the pixels in the colored image, calculate the distance from the average character color using the formulas above, and for any colored pixel that exceeds a threshold, set the corresponding gray image pixel to 255. We also keep track of the lightest and darkest gray level of the character pixels. We then expand the dynamic range of the gray image so the lightest character level maps to 255 and the darkest maps to 0. The result is the image 50 shown in FIG. 5. That is, FIG. 5 illustrates a pictorial diagram of an image 50 in which the dynamic range of a gray image is expanded so that the highest character level maps to 255, with the darkest character level mapping to 0, in accordance with an example embodiment.

Figure 6:
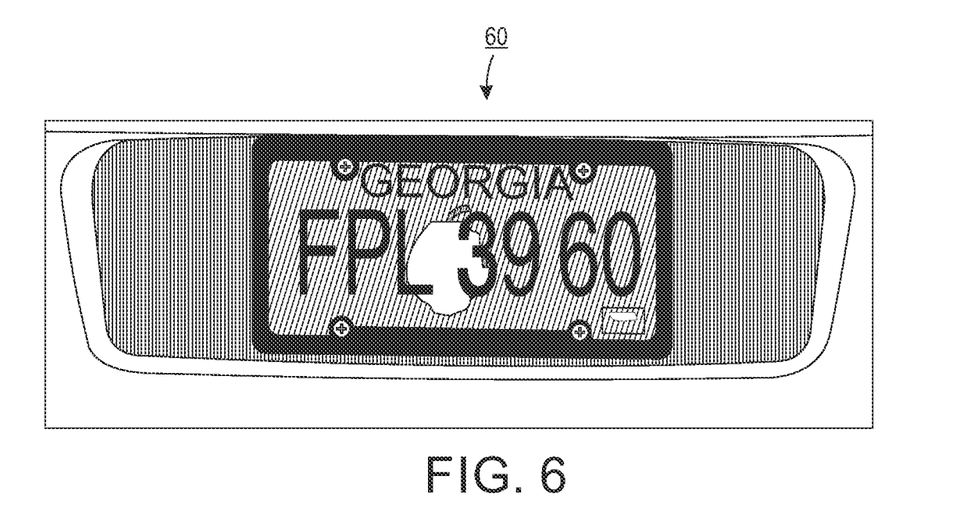
FIG. 6 illustrates a pictorial diagram of an image wherein the transition is smoothed into the white region by iteratively setting the originally white pixels to a weighted sum of their original value, and the average lightness of the surrounding pixels, in accordance with an example embodiment.

The confusing orange peach has been removed. However, due to the low contrast of the original image, the light gray background was close enough to the color of the dark gray characters to be considered a character color. This is not an uncommon occurrence. It turns out that the extremely sharp edge between the light gray background and the white region where the peach was removed confuses the license plate recognition pipeline. We therefore smooth the transition into the white region by iteratively setting the originally white pixels to a weighted sum of their original value and the average lightness of the surrounding pixels. The result is depicted in FIG. 6. That is, FIG. 6 illustrates a pictorial diagram of an image 60 wherein the transition is smoothed into the white region by iteratively setting the originally white pixels to a weighted sum of their original value and the average lightness of the surrounding pixels, in accordance with an example embodiment.

Thus, utilizing this approach when the conventional gray image approach gives results with low confidence increases the license plate recognition automation rate by about 5% at 1% error. The processing only adds about 300 milliseconds. This example result is for the NC Open Road Tolling installation. We currently only have bulk color imagery from NC and this was used to develop the algorithm. We expect that the impact of this approach will be much larger for installations where plates with challenging color backgrounds are dominant such as FL, IL, OR, SC, and TN.

Figure 7:
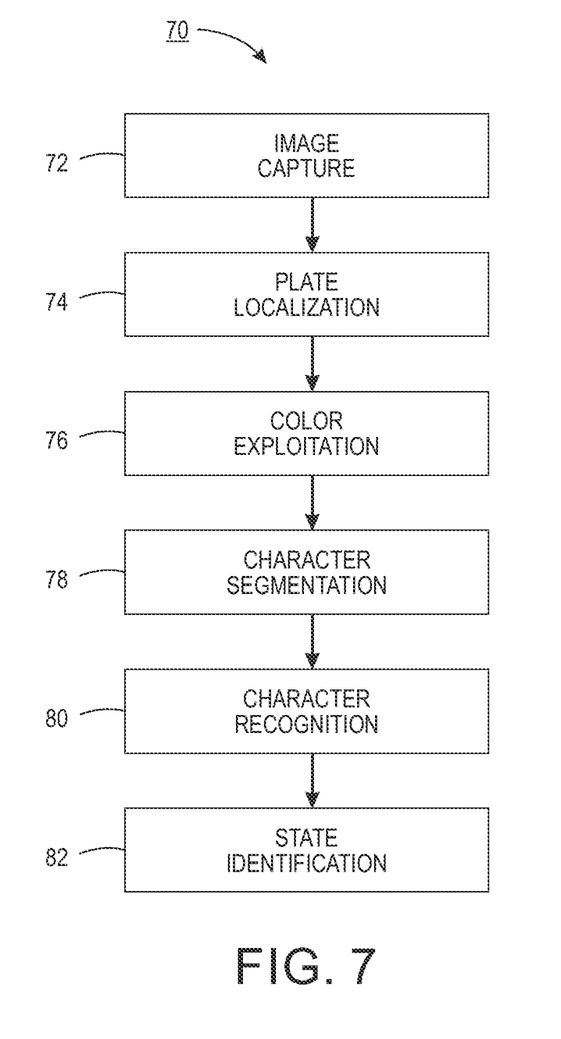
FIG. 7 illustrates a block diagram of an ALPR (Automatic License Plate Recognition) system, which can be implemented in accordance with an example embodiment.

FIG. 7 illustrates a block diagram of an ALPR system 70, which can be implemented in accordance with an example embodiment. ALPR system 70 generally includes an image capture module 72 that provides data (e.g., an image) to a license plate localization module 74. Output from module 74 can be input to a color exploitation module 76, which in turns provides output that is input to a character segmentation module 78, which in turn outputs data that is input to a character recognition module 80. Data output from the character recognition module 80 is then provided as input to a state identification module 82 (e.g., for identifying the state associated with a license plate). The license plate localization module 74 returns a color region of interest that contains the license plate. The color exploitation module 76 optimally converts this to a single channel gray such to assist the downstream modules 78 and 80 in doing a better job and ensuring that the entire result is correct. The color exploitation module 76 implements instructions and operations, as illustrated and described herein, for exploiting color for license plate recognition. FIG. 7 thus provides a visual context for the disclosed approach described herein, which can be implemented to exploit color for license plate recognitions applications.

Figure 8:
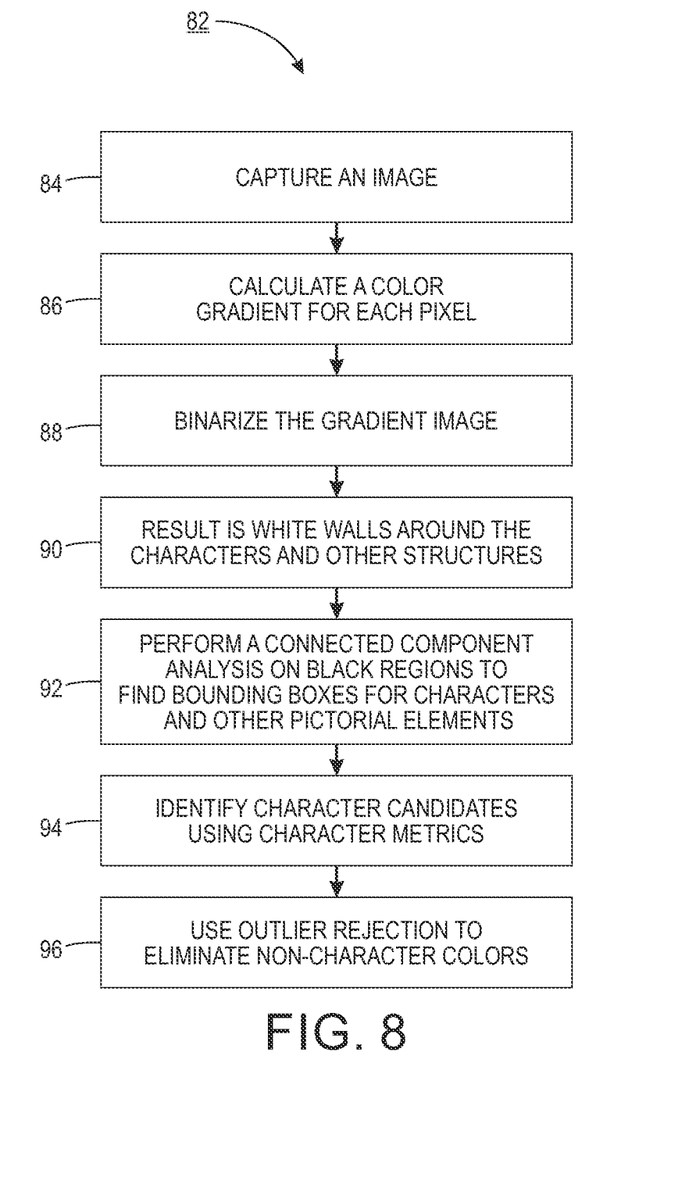
FIG. 8 illustrates a high-level flow chart of operations depicting logical operational steps of a method for exploiting color for license plate recognition, in accordance with an example embodiment.

FIG. 8 illustrates a high-level flow chart of operations depicting logical operational steps of a method 82 for exploiting color for license plate recognition, in accordance with an example embodiment. The method 82 depicted in FIG. 8 can be implemented to find the distribution of character colors and declare as background all colors that are sufficiently far from the average color. The range of gray levels of pixels associated with characters can be stretched, for example, to fill the 0-255 range. The background can be set to white or near white. This gray image can then be fed to the rest of the ALPR or LPR image-processing pipeline. The higher contrast and removal of confusing structures greatly improves its performance.

To find the character colors, at least one character must first be found. To do this we calculate a color gradient for each pixel and binarize the gradient image. For example, as shown at block 84, an image-capturing device such as, for example, the image-capturing unit 332 shown in FIG. 9 initially captures an image. As indicated next at block 86, a step or operation can be implemented to calculate a color for each pixel, and then as shown at block 88, the gradient image is then binarized. The result, as shown at block 90, is white walls around the characters and other structures (as discussed previously herein).

Next, as illustrated at block 92, a step or operation can be implemented to perform a connected component analysis on the black regions of the image to find bounding boxes for characters and other pictorial elements. Then, as depicted at block 94, using various character metrics (e.g., pixel count, height, and width) character candidates are identified. The outlier rejection can then be used to eliminate the non-character colors, as shown at block 96. The approach shown in FIG. 8 can be implemented in some example embodiments as a front end for an ALPR or LPR image-processing pipeline. This approach greatly improves results for difficult cases where the existing system provides answers with a low confidence.

Note that in some embodiments, computer program code for carrying out operations of the disclosed embodiments may be written in an object oriented programming language (e.g., Java. C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wimax, 802.xx, and cellular network or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 9:
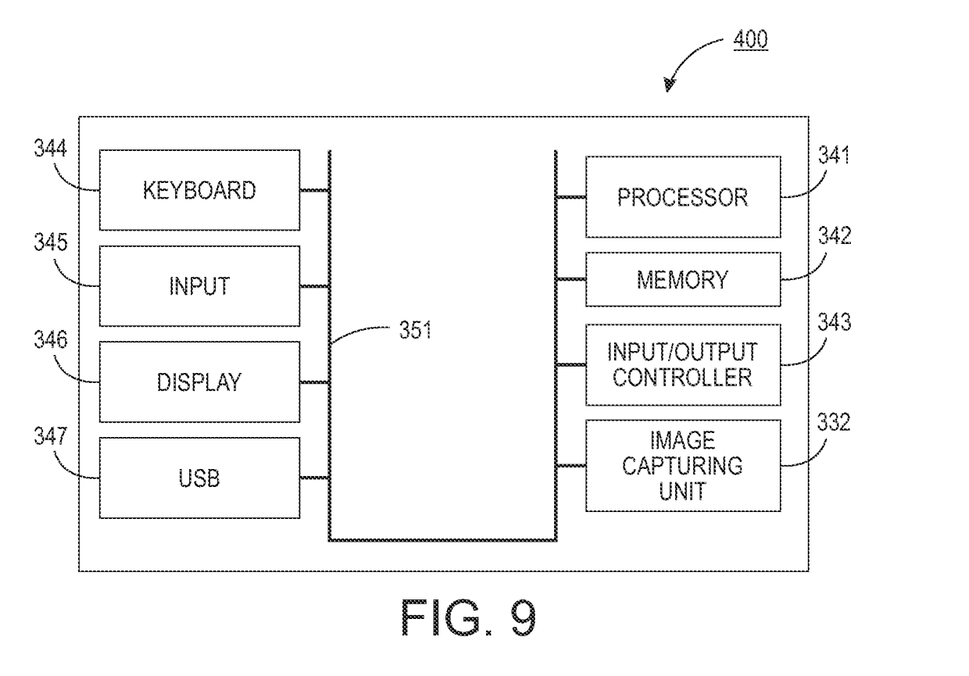
FIG. 9 illustrates a schematic view of a computer system, in accordance with an example embodiment.
Figure 10:
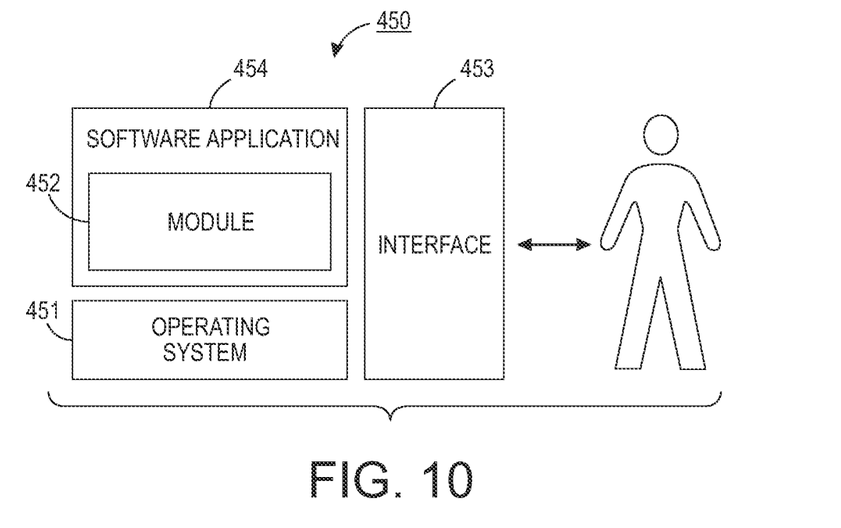
FIG. 10 illustrates a schematic view of a software system including a module, an operating system, and a user interface, in accordance with an example embodiment.

FIGS. 9-10 are shown only as exemplary diagrams of data-processing environments in which embodiments may be implemented. It should be appreciated that FIGS. 9-10 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 9, some embodiments may be implemented in the context of a data-processing system 400 that can include one or more processors such as processor 341, a memory 342, a controller 343 (e.g., an input/output controller), a peripheral USB (Universal Serial Bus) connection 347, a keyboard 344 (e.g., a physical keyboard or a touchscreen graphically displayed keyboard), an input component 345 (e.g., a pointing device, such as a mouse, track ball, pen device, which may be utilized in association or with the keyboard 344, etc.), a display 346, and in some cases, an image-capturing unit 332 (e.g., a digital video camera, an ALPR, camera, etc.). Data-processing system 400 may be, for example, a client computing device (e.g., a client PC, laptop, tablet computing device, etc.), which communicates with peripheral devices (not shown) via a client-server network (e.g., wireless and/or wired).

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be, for example, a standalone desktop computer, a laptop computer, a Smartphone, a pad computing device, a server, and so on.

FIG. 10 illustrates a computer software system 450 for directing the operation of the data-processing system 400 shown in FIG. 9. Software application 454, stored for example in memory 342, generally includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454. The interface 453, in some embodiments, can serve to display results, whereupon a user may supply additional inputs or terminate a session.

The software application 454 can include one or more modules such as module 452, which can, for example, implement instructions or operations such as those described herein. Examples of instructions that can be implemented by module 452 include steps or operations such as those shown and described herein with respect to blocks 72, 74, 76, 78, 80, and 82 of FIG. 7 and blocks 84, 86, 88, 90, 92, 94, and 96 of FIG. 8 and elsewhere herein.

The following discussion is intended to provide a brief, general description of suitable computing environments in which the system and method may be implemented. Although not required, the disclosed embodiments will be described in the general context of computer-executable instructions, such as program modules being executed by a single computer. In most instances, a "module" constitutes a software application. However, a module may also be composed of, for example, electronic and/or computer hardware or such hardware in combination with software. In some cases, a "module" can also constitute a database and/or electronic hardware and software that interact with the database.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the instructions or steps such as those shown in FIGS. 7-8 and discussed elsewhere herein can be implemented in the context of such a module or modules, sub-modules, and so on.

FIGS. 9-10 are thus intended as examples and not as architectural limitations of the disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

Based on the foregoing, it can be appreciated that a number of example preferred and alternative embodiments are disclosed. In an example embodiment, a method can be implemented for exploiting color for object recognition. Such a method, can include steps or logical operations such as identifying one or more regions of an image having character-like features, obtaining an average color of the one or more regions after discarding outliers associated with the region or regions, and modifying all portions of the image with colors sufficiently far from the average color to white. Such an average color can be an average character color.

In another example embodiment, the aforementioned character-like features can be at least one of a pixel count or pixel size. In another example embodiment, the step or logical operation of discarding outliers associated with the at least one region can involve a step or operation for eliminating non-character colors in the region (or regions) utilizing an outlier rejection. In still another example embodiment, the aforementioned average color can be an average character color and the character-like features can be at least one of a pixel count or pixel size.

In yet another example embodiment, the image can be a three-channel text image. A step or operation can be provided for converting the three-channel text image to a single channel image having a contrast between text and background maximized in the single channel image.

In another example embodiment, a system for exploiting color for object recognition can be implemented. Such a system can include, for example, one or more processors (e.g., processor 341 shown in FIG. 9) and a computer-usable medium embodying computer program code, the computer-usable medium capable of communicating with the processor (or processors). The computer program code can include instructions executable by the processor(s) and configured for: identifying at least one region of an image having character-like features, obtaining an average color of the at least one region after discarding outliers associated with the at least one region, and modifying all portions of the image with colors sufficiently far from the average color to white.

In another example embodiment, a non-transitory processor-readable medium storing code representing instructions to cause a process for exploiting color for object recognition can be implemented. Such code can include code to, for example, identify one or more regions of an image having character-like features, obtaining an average color of the region (or regions) after discarding outliers associated with the region(s), and modify all portions of the image with colors sufficiently far from the average color to white.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for exploiting color for object recognition, said method comprising:
   identifying at least one region of an image having character-like features;
   obtaining an average color of said at least one region after using an outlier rejection in a perceptually uniform color space to eliminate non-character colors associated with said at least one region; and
   modifying all portions of said image with colors that are a fixed amount above said average color, after said obtaining said average color of said least one region after using said outlier rejection to eliminate said noncharacter colors.

2. The method of claim 1 wherein said average color comprises an average character color and wherein said perceptually uniform color spaces comprises a L*a*b* color space, wherein L* represents lightness, a* is a magenta axis with 0 being neutral and green being green, and wherein b* is a yellow axis with 0 being neutral and blue being negative.

3. The method of claim 2 wherein said character-like features comprise a pixel count.

4. The method of claim 1 wherein said outlier rejection includes calculating a covariance matrix for a list containing colors of all pixels assumed to be in said character-like features and then calculating a distance of each pixel among said pixels from said average color using an equation of $D=V^t M V$ where $V=P-A$, $V^t$ is a transpose, M is an inverse of said covariance matrix, P is a pixel color, and A is an average character color, and further includes eliminating all pixels where D is greater than a specified value, and then recalculating said covariance matrix and said average color, and iterating until no more pixels are removed.

5. The method of claim 4 wherein said average color comprises an average character color and wherein said character-like features comprise a pixel count and a pixel size.

6. The method of claim 2 wherein said image comprises a three-channel text image.

7. The method of claim 6 further comprising converting said three-channel text image to a single channel image having a contrast between text and background maximized in said single channel image.

8. A system for exploiting color for object recognition, said system comprising:
   at least one processor; and
   a non-transitory computer-usable medium embodying computer program code, said computer-usable medium capable of communicating with said at least one processor, said computer program code comprising instructions executable by said at least one processor and configured for:
      identifying at least one region of an image having character-like features;
      obtaining an average color of said at least one region after using an outlier rejection in a perceptually uniform color space to eliminate non-character colors associated with said at least one region; and
      modifying all portions of said image with colors that are a fixed amount above said average color, after said obtaining said average color of said least one region after using said outlier rejection to eliminate said noncharacter colors.

9. The system of claim 8 wherein said average color comprises an average character color wherein said perceptually uniform color spaces comprises a L*a*b* color space, and wherein L* represents lightness, a* is a magenta axis with 0 being neutral and green being green, and wherein b* is a yellow axis with 0 being neutral and blue being negative.

10. The system of claim 9 wherein said character-like features comprise a pixel count.

11. The system of claim 8 wherein said outlier rejection includes instructions for calculating a covariance matrix for a list containing colors of all pixels assumed to be in said character-like features and then calculating a distance of each pixel among said pixels from said average color using an equation of $D=V^t M V$ where $V=P-A$, $V^t$ is a transpose, M is an inverse of said covariance matrix, P is a pixel color, and A is an average character color, and further includes eliminating all pixels where D is greater than a specified value, and then recalculating said covariance matrix and said average color, and iterating until no more pixels are removed.

12. The system of claim 11 wherein said average color comprises an average character color and wherein said character-like features comprise a pixel count and a pixel size.

13. The system of claim 9 wherein said image comprises a three-channel text image.

14. The system of claim 13 wherein said instructions are further configured for converting said three-channel text image to a single channel image having a contrast between text and background maximized in said single channel image.

15. A non-transitory processor-readable medium storing code representing instructions to cause a process for exploiting color for object recognition, said code comprising code to:
   identify at least one region of an image having character-like features;
   obtain an average color of said at least one region after using an outlier rejection in a perceptually uniform color space to eliminate non-character colors associated with said at least one region; and
   modify all portions of said image with colors that are a fixed amount above said average color, after said obtaining said average color of said least one region after using said outlier rejection to eliminate said noncharacter colors.

16. The processor-readable medium of claim 15 wherein said average color comprises an average character color and wherein said perceptually uniform color spaces comprises a L*a*b* color space, wherein L* represents lightness, a* is a magenta axis with 0 being neutral and green being green, and wherein b* is a yellow axis with 0 being neutral and blue being negative.

17. The processor-readable medium of claim 16 wherein said character-like features comprise a pixel count.

18. The processor-readable medium of claim 15 wherein said outlier rejection includes calculating a covariance matrix for a list containing colors of all pixels assumed to be in said character-like features and then calculating a distance of each pixel among said pixels from said average color using an equation of $D=V^t M V$ where $V=P-A$, $V^t$ is a transpose, M is an inverse of said covariance matrix, P is a pixel color, and A is an average character color, and further includes eliminating all pixels where D is greater than a specified value, and then recalculating said covariance matrix and said average color, and iterating until no more pixels are removed.

19. The processor-readable medium of claim 18 wherein said average color comprises an average character color and wherein said character-like features comprise a pixel count and a pixel size.

20. The processor-readable medium of claim 16 wherein said image comprises a three-channel text image and wherein said code further comprises code to convert said three-channel text image to a single channel image having a contrast between text and background maximized in said single channel image.

* * * * *